United States Patent
Dijt et al.

(10) Patent No.: US 9,856,352 B2
(45) Date of Patent: Jan. 2, 2018

(54) GLASS FIBER SIZING COMPOSITIONS, SIZED GLASS FIBERS, AND POLYOLEFIN COMPOSITES

(71) Applicant: PPG Industries Ohio, Inc., Cleveland, OH (US)

(72) Inventors: Jacob Cornelis Dijt, Eelde (NL); Jacobus Hendricus Antonius van der Woude, Leek (NL); John Theo Penning, Tynaarlo (NL); Renata Drozdzak Matusiak, Wasquehal (FR)

(*) Notice: Subject to any disclaimer, the term of this patent is extended or adjusted under 35 U.S.C. 154(b) by 0 days.

(21) Appl. No.: 14/454,206

(22) Filed: Aug. 7, 2014

(65) Prior Publication Data

US 2016/0039982 A1 Feb. 11, 2016

(51) Int. Cl.
| | |
|---|---|
| *C08J 5/08* | (2006.01) |
| *C08K 5/5425* | (2006.01) |
| *C08L 83/00* | (2006.01) |
| *C09D 147/00* | (2006.01) |
| *C03C 25/28* | (2006.01) |
| *C03C 25/40* | (2006.01) |

(52) U.S. Cl.
CPC .......... *C08J 5/08* (2013.01); *C03C 25/28* (2013.01); *C03C 25/40* (2013.01); *C08K 5/5425* (2013.01); *C08L 83/00* (2013.01); *C09D 147/00* (2013.01); *C08J 2345/00* (2013.01); *C08J 2447/00* (2013.01)

(58) Field of Classification Search
CPC .............................. C08K 5/5425; C08L 83/00
See application file for complete search history.

(56) References Cited

U.S. PATENT DOCUMENTS

| | | | |
|---|---|---|---|
| 3,837,898 A | 9/1974 | McCombs et al. | |
| 4,020,125 A * | 4/1977 | Suzuki ................ | C08C 19/30 522/98 |
| 4,154,715 A * | 5/1979 | Kruse .................. | C08F 279/04 524/157 |
| 4,179,477 A * | 12/1979 | Bockstie, Jr. ........ | C08F 279/02 428/432 |
| 6,207,737 B1 | 3/2001 | Schell et al. | |
| 6,323,296 B1 | 11/2001 | Warner et al. | |
| 6,436,476 B1 | 8/2002 | Sage, Jr. | |
| 6,890,650 B2 | 5/2005 | Hedden | |
| 7,226,975 B2 * | 6/2007 | Voorheis ............... | C08K 5/098 473/371 |

FOREIGN PATENT DOCUMENTS

| | | |
|---|---|---|
| EP | 0 338 128 | 10/1989 |
| EP | 1468004 | 10/2004 |
| EP | 1577282 | 9/2005 |
| EP | 1757613 | 2/2007 |
| EP | 2151446 | 2/2010 |
| EP | 2280017 | 2/2011 |
| EP | 2460587 | 6/2012 |
| JP | 52037951 A * | 3/1977 |
| WO | WO 01/49628 | 7/2001 |
| WO | WO 2016/022751 | 2/2016 |
| WO | WO 2016/022763 | 2/2016 |

OTHER PUBLICATIONS

Full English-language translation of JP 52-037951 A, Mar. 24, 1977.*
Loewenstein, K., The Manufacturing Technology of Continuous Glass Fibers, 3rd Ed., 1993, pp. 47-48, 117-234.
Patent Cooperation Treaty, International Search Report and Written Opinion, International Application No. PCT/US2015/043947 dated Nov. 5, 2015, 10 pages.
International Report on Patentability dated Feb. 16, 2017 for International Application No. PCT/US2015/043947.
International Report on Patentability dated Feb. 16, 2017 for International Application No. PCT/US2015/043922.

* cited by examiner

*Primary Examiner* — Vickey Nerangis
(74) *Attorney, Agent, or Firm* — Kilpatrick Townsend & Stockton LLP

(57) ABSTRACT

The present invention relates to sizing compositions, to glass fibers at least partially coated with such sizing compositions, to a variety of fiber glass products at least partially coated with such sizing compositions, and to composites formed from cycloolefins and reinforced with glass fibers at least partially coated with sizing compositions of the present invention. In one non-limiting embodiment, a sizing composition for glass fibers comprises a film-former comprising a polymer, wherein the repeating unit of the polymer comprises at least four carbon atoms and at least one carbon-carbon double bond, and a silane. A sizing composition for glass fibers, in another non-limiting embodiment, comprises a film-former comprising a polymer, wherein the repeating unit of the polymer comprises four to six carbon atoms and one carbon-carbon double bond, in an amount between about 60 and about 90 weight percent on a total solids basis, and a silane comprising a terminal vinyl group in an amount between about 5 and about 25 weight percent on a total solids basis.

23 Claims, 4 Drawing Sheets

GLASS FIBER SIZING COMPOSITIONS, SIZED GLASS FIBERS, AND POLYOLEFIN COMPOSITES

FIELD OF THE INVENTION

The present invention relates generally to sizing compositions for glass fibers and, in particular, to sizing compositions for glass fibers suitable to reinforce polyolefin articles, including dicyclopentadiene (DCPD) resins.

BACKGROUND OF THE INVENTION

Glass fibers are produced by flowing molten glass via gravity through a multitude of small openings in a precious metal device, called a bushing. Typical formulations of glass fibers are disclosed in K. Loewenstein, *The Manufacturing Technology of Continuous Glass Fibres*, (3d Ed. 1993).

After the fibers have cooled very shortly after their issuance from the bushing and usually in close proximity to the bushing, these fibers are treated with a chemical treating formulation usually referred to in the art as a sizing composition, sizing, or size. The sizing composition serves to make the fibers more compatible with the material they will ultimately be used to reinforce and to make the fibers easier to process. The sizing composition can be applied by sprayers, rollers, belts, metering devices or any similar application device. The sized glass fibers are gathered into bundles or strands comprising a plurality of individual fibers, generally from 200 to more than 4000.

After their formation and treatment, the strands can be wound into a spool or "forming package" and/or may be chopped. The forming packages or chopped strands are usually dried in either an oven or at room temperature to remove some of the moisture from the fibers. Strands from the forming packages may also be wound into rovings.

The strands of treated fibers can be used to reinforce various materials such as thermoplastic polymers and thermosetting polymers. One example of a commercially important use of treated fibers is to reinforce olefinic thermosetting polymers, especially polymers of cycloolefins. It would be desirable to have commercial fiber glass materials that are effective reinforcements for cycloolefinic resins that cure by the ring-opening metathesis polymerization ("ROMP") reaction. In particular, it would be desirable to have commercial fiber glass materials that are effective reinforcements for polymers formed from dicyclopentadiene ("DCPD") monomer.

There is a growing need for an effective fiber glass reinforcement for DCPD resins. These resins have a number of advantages over more conventional thermoset resins, especially the widely used polyester resins that have styrene as a co-monomer and diluent. In addition, DCPD resins may provide unique toughness and corrosion properties as compared to conventional thermoset resins.

SUMMARY

The present invention relates to sizing compositions, to glass fibers at least partially coated with such sizing compositions, to a variety of fiber glass products at least partially coated with such sizing compositions, and to composites formed from cycloolefins and reinforced with glass fibers at least partially coated with sizing compositions of the present invention. The present invention also relates to methods of forming fiber glass strands and methods of forming polyolefin composites.

Fiber glass strands at least partially coated with sizing compositions of the present invention may impart desirable or improved strength when used to reinforce polyolefin articles, such as cycloolefins that cure by ring opening metathesis polymerization. Sizing compositions of the present invention, in some embodiments, are believed to improve the adhesion between a fiber glass reinforcement coated with the sizing composition and the polyolefin resin. In addition, because a ROMP catalyst is often used to cure cycloolefins, the sizing compositions of the present invention are also adapted to not poison the ROMP catalysts.

In one embodiment of the present invention, a sizing composition for glass fibers comprises a film-former comprising a polymer, wherein the repeating unit of the polymer comprises at least four carbon atoms and at least one carbon-carbon double bond, and a silane. In one non-limiting embodiment, the at least one carbon-carbon double bond is in the backbone chain of the polymer.

In some embodiments, the film-former comprises a polymer, wherein the repeating unit of the polymer comprises four to six carbon atoms and one carbon-carbon double bond. In other embodiments, the film-former comprises at least one of polybutadiene, polypentadiene, and polyhexadiene. In some embodiments, one or more repeating units in the polymer comprises at least one pendant group. In some embodiments, the one or more pendant groups comprise at least one vinyl group. The one or more pendant groups in some embodiments comprise at least one cyclic pendant group. In some embodiments, the one or more pendant groups include others disclosed herein as well as combinations thereof.

The film-former, in some embodiments, comprises at least about 60 weight percent of the sizing composition on a total solids basis (e.g., up to about 90 weight percent of the sizing composition on a total solids basis). In some embodiments, the film-former comprises between about 70 and about 85 weight percent of the sizing composition on a total solids basis. In other embodiments, the film-former comprises at least about 20 weight percent of the sizing composition on a total solids basis.

Non-limiting embodiments of the present invention may also comprise a second film-former. In some embodiments, the second film-former can be present in an amount of at least 20 weight percent on a total solids basis. In some such embodiments, the film-former comprising a polymer, wherein the repeating unit of the polymer comprises at least four carbon atoms and at least one carbon-carbon double bond, can be present in an amount of at least about 20 weight percent of the sizing composition on a total solids basis, and the second film-former comprises at least about 20 weight percent of the sizing composition on a total solids basis. The second film-former, in some embodiments, comprises paraffin wax and polymers or copolymers of propylene, ethylene, isobutylene, styrene, maleic anhydride, acrylate, or combinations thereof.

In one non-limiting embodiment, the film-former comprises polybutadiene. In these embodiments, the sizing composition may comprise at least about 60 weight percent polybutadiene on a total solids basis (e.g., up to about 90 weight percent polybutadiene on a total solids basis). In some embodiments, the sizing composition comprises between about 70 and about 85 weight percent polybutadiene on a total solids basis. The polybutadiene, in some embodiments, has a number average molecular mass of less than 20,000. In other embodiments, the polybutadiene has a number average molecular mass of less than 10,000. In some embodiments, the sizing composition comprises at least about 20 weight percent polybutadiene on a total solids basis. In some embodiments comprising at least about 20 weight percent polybutadiene, the sizing compositions may further comprise a second film-former in an amount of at least about 20 weight percent on a total solids basis. The second film-former, in some embodiments, comprises paraffin wax and polymers or copolymers of propylene, ethylene, isobutylene, styrene, maleic anhydride, acrylate, or combinations thereof.

Silanes that can be used in various embodiments of the present invention include, silanes that comprise a terminal vinyl group including, for example, a vinylbenzyl group, a methacryloxypropyltrialkoxysilane, and combinations thereof. In some embodiments, the silane may comprise at least about 2 weight percent of the sizing composition on a total solids basis. In some embodiments, the silane may comprise at least about 5 weight percent of the sizing composition on a total solids basis. In other embodiments, the silane may comprise up to about 25 weight percent of the sizing composition on a total solids basis. The silane may comprise between about 5 and about 25 weight percent of the sizing composition in some embodiments. In a further embodiment, the silane may comprise between about 10 and about 20 weight percent of the sizing composition on a total solids basis.

Non-limiting embodiments of the present invention may also comprise an antioxidant and/or a surfactant. In some embodiments, the surfactant comprises less than about 10 weight percent of the sizing composition on a total solids basis.

In some embodiments, the sizing composition is an aqueous sizing composition.

Another embodiment of a sizing composition for glass fibers of the present invention comprises a film-former comprising a polymer, wherein the repeating unit of the polymer comprises four to six carbon atoms and one carbon-carbon double bond, in an amount between about 60 and about 90 weight percent on a total solids basis; and a silane comprising a terminal vinyl group in an amount between about 5 and about 25 weight percent on a total solids basis.

A further embodiment of a sizing composition for glass fibers of the present invention consists essentially of a film-former comprising a polymer, wherein the repeating unit of the polymer comprises four to six carbon atoms and one carbon-carbon double bond; a silane comprising a terminal vinyl group; and one or more surfactants.

The present invention also relates to fiber glass strands comprising at least one glass fiber at least partially coated with any of the sizing compositions of the present invention.

The present invention also relates to polyolefin composites. In one embodiment, a polyolefin composite of the present invention comprises: (a) a plurality of glass fibers at least partially coated with any of the sizing compositions of the present invention; and (b) a polyolefin prepared by polymerizing a cycloolefin using a ring-opening metathesis polymerization catalyst. The polyolefin, in one non-limiting embodiment, may comprise polymers formed by polymerizing dicyclopentadiene.

These and other embodiments of the present invention are described in greater detail in that follows.

DETAILED DESCRIPTION

Figure 1:
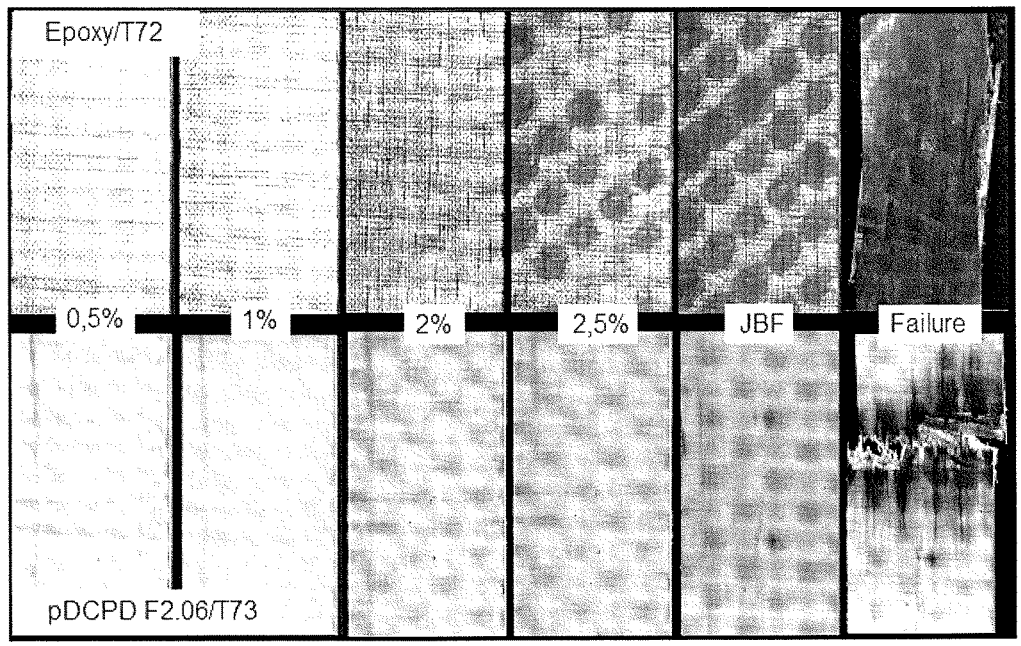
FIG. 1 shows transmitted light pictures of samples during tensile testing, for various strain levels. JBF indicates "just before failure" (one second).

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

In some embodiments, the present invention relates to sizing compositions for coating materials used to reinforce composites. While a number of reinforcing materials may be used to reinforce composites, including, for example, polyester fibers, polyolefin fibers, and polyamide fibers, embodiments of sizing compositions of the present invention are particularly suitable for use in coating glass fibers.

Embodiments of the present invention are directed to sizing compositions for glass fibers. The sizing compositions in non-limiting embodiments of the present invention are useful in coating glass fibers to be used as reinforcement for cycloolefins that cure by the ring-opening metathesis polymerization ("ROMP") reaction. The polymerization of cycloolefins via ROMP reactions usually requires the presence of a ROMP catalyst to cure the composite. Examples of ROMP catalysts for polymerization of cycloolefins include, for example, ruthenium, osmium, and molybdenum metal carbene catalysts as known to those of skill in the art.

In non-limiting embodiments, the sizing compositions of the present invention are useful with fiber glass reinforcements in dicyclopentadiene ("DCPD") resins. While sizing compositions are primarily discussed herein in connection with their use on fiber glass reinforcements for reinforcing DCPD resins, it should be understood that the sizing compositions may also be used to at least partially coat glass fibers for reinforcing other cycloolefins that can be polymerized by a ring opening metathesis polymerization reaction, including those reactions set forth in U.S. Pat. No. 6,436,476 and U.S. Pat. No. 6,323,296, which are hereby incorporated by reference. The sizing compositions may also be useful with fiber glass products used to reinforce other unsaturated, free radical cure resins that do not necessarily cure by ROMP, such as polyester.

The general reaction mechanism for polymerization of DCPD using ROMP is as follows:

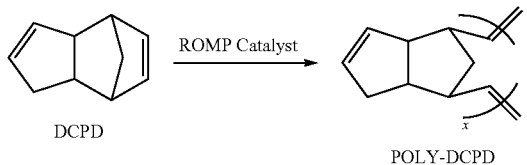

One difficulty in producing compatible and effective fiber glass for use as reinforcement with polymers formed from DCPD is that the various ingredients typically used in fiber glass sizing compositions may inhibit polymerization by "poisoning" the ROMP catalyst. As used herein, the term "poisoning", when used in connection with a sizing composition or components of a sizing composition, refers to a sizing composition or a component thereof that negatively affects the polymerization of a cycloolefin by, for example, inhibiting, slowing, preventing, or terminating the desired polymerization process. For example, a component of a sizing composition may react with the ROMP catalyst to produce a species that is not a catalyst, and thereby prevent the ROMP catalyst from polymerizing the monomer. Consequently, there have been continuing efforts by catalyst suppliers to reduce the sensitivity of the ROMP catalyst chemistry to sizing components. It would be desirable to have a sizing composition that would not limit curing of the DCPD, while still producing composites with an acceptable shear strength.

The present invention advantageously provides sizing compositions that are compatible with ROMP catalysts, such that the sizing compositions do not substantially inhibit polymerization by poisoning the ROMP catalyst. The sizing compositions of the present invention, when at least partially coated on glass fibers used to reinforce polymerized cycloolefins, also provide composites having adequate or desirable shear strengths in some embodiments. The selection of components and their relative amounts can provide such features and others.

In one non-limiting embodiment, a sizing composition of the present invention comprises at least one film-former comprising a polymer, wherein the repeating unit of the polymer comprises at least four carbon atoms and at least one carbon-carbon double bond, and at least one silane.

Film-formers useful in non-limiting embodiments of the present invention have relatively low potentials for poisoning the ROMP catalyst used to polymerize cycloolefinic resins. In some embodiments, film-formers useful in non-limiting embodiments of the present invention may be free from (i.e., may not include) primary amines, thiols, terminal epoxides, functional groups having active oxygen groups (e.g., hydroperoxides and activated epoxides), acetylenes, and vinyl ethers. To avoid poisoning ROMP catalysts, film-formers useful in non-limiting embodiments of the present invention may be substantially free from, or may only include in a limited way (i.e., less than 1 weight percent, less than 0.5 weight percent, less than 0.1 weight percent, less than 0.05 weight percent, or less than 0.01 weight percent by weight), the following functional groups: primary amines, thiols, terminal epoxides, functional groups having active oxygen groups (e.g., hydroperoxides and activated epoxides), acetylenes, and vinyl ethers. Such structures are believed to poison and/or adversely affect the operation of the ROMP catalyst. As noted below, silanes used in embodiments of the present invention may also not include these functional groups. Certain constituents that can act as Lewis bases may also not be desirable for use as a film-former in embodiments of the present invention. Film-formers useful in embodiments of the present invention can also assist in holding fiber glass filaments together to form a strand that can be wet out by liquid resins.

The film-formers, in some embodiments, comprise a polymer that includes at least one carbon-carbon double bond in the backbone chain of the polymer. In some embodiments, the repeating unit (i.e., the monomeric unit) of the polymer comprises four to six carbon atoms and one carbon-carbon double bond. The film-formers, in some embodiments, can comprise at least one of polybutadiene, polypentadiene, and polyhexadiene. Other common film-formers that would not poison the ROMP catalyst (e.g., by reacting with the ROMP catalyst to form a non-catalytic species) can also be used as additional film-formers in some embodiments.

In some embodiments, the backbone chain of the polymer can include the following polybutadiene repeating unit comprising four carbon atoms and one carbon-carbon double bond, according to one of the structures shown below:

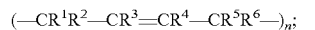

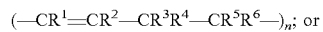

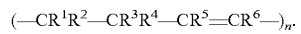

In the polybutadiene repeating unit, "n" is an integer greater than 1. In some embodiments, "n" is an integer from 20 to 400. Also in the polybutadiene repeating unit, $R^1$, $R^2$, $R^3$, $R^4$, $R^5$, and $R^6$ are each independently hydrogen, an aliphatic moiety, a heteroaliphatic moiety, a carbocyclic moiety, or a heterocyclic moiety. In some embodiments, each of $R^1$-$R^6$ is hydrogen. In some embodiments, one or more of $R^1$, $R^2$, $R^3$, $R^4$, $R^5$, and $R^6$ can be a pendant group or a linking molecule that connects the backbone to a pendant group. Optionally, the polybutadiene repeating unit has a trans configuration.

Optionally, one or more groups can be pendant from the backbone chain of the polymer. In some embodiments, one or more pendant groups can be attached to one or more of the repeating units. For example, for a polymer with 100 repeating units (i.e., n is 100), pendant groups could be attached to from 0 to 100 of the units. In other words, the percentage of pendant group-containing repeating units in the polymer can be 100% or less (e.g., 90% or less, 80% or less, 70% or less, 60% or less, 50% or less, 40% or less, 30% or less, 20% or less, 10% or less, 5% or less, or 1% or less), based on the total number of repeating units in the polymer. In some embodiments, one or more of $R^1$, $R^2$, $R^3$, $R^4$, $R^5$, and $R^6$ can include a pendant group. In other embodiments, two R groups on adjacent carbons (e.g., $R^1$ and $R^3$, $R^3$ and $R^4$, or $R^4$ and $R^5$) can combine together, forming a carbocyclic moiety or a heterocyclic moiety. In some non-limiting embodiments, the pendant group can include a vinyl group. In other non-limiting embodiments, the pendant group can include a cyclic group, such as a cyclopentene group. In some non-limiting embodiments, the pendant group can include maleic anhydride. Different pendant groups can be present in the polymer in varying amounts. For example, for a polymer with 100 repeating units (i.e., n is 100), a vinyl pendant group can be attached to from 15-25% of the repeating units in the polymer and the remainder of the repeating units in the polymer can be unmodified (i.e., no pendant groups attached). In another embodiment, for a polymer with 100 repeating units (i.e., n is 100), a vinyl pendant group can be attached to from 40-55% of the repeating units in the polymer, a cyclic pendant group can be attached to from 15-20% of the repeating units in the polymer, and the remainder of the repeating units in the polymer can be unmodified (i.e., no pendant groups attached). In one non-limiting embodiment, the at least one film-former may be a functionalized polymer, such as a maleic anhydride functionalized polymer. For example, the at least one film-former may be a maleic anhydride functionalized polybutadiene. The maleic anhydride functionalized polymers can be prepared by reacting maleic anhydride with a carbon-carbon double bond of the backbone chain of the polymer under thermal conditions to form a maleic anhydride adduct.

In one non-limiting embodiment, the at least one film-former comprises a polybutadiene having a number average molecular mass of less than 20,000. For example, the polybutadiene can have a number average molecular mass of 17,500 or less; 15,000 or less; 12,500 or less; 10,000 or less; 7,500 or less; 5,000 or less; or 3,000 or less in various embodiments.

Examples of suitable polybutadienes useful as film-formers in a non-limiting embodiment of the present invention include functionalized and non-functionalized polybutadienes, such as those polybutadienes commercially available from Synthomer, Inc. (Harlow, United Kingdom), under the Lithene product name. For example, suitable non-functional polybutadienes include, without limitation, Lithene Ultra AL, a polybutadiene having a number average molecular mass of 1,000 and containing vinyl and cyclic pendant groups; Lithene Ultra AH, a polybutadiene having a number average molecular mass of 1,800 and containing vinyl and cyclic pendant groups; Lithene Ultra PH, a polybutadiene having a number average molecular mass of 2,600 and containing vinyl pendant groups; Lithene Ultra PM4, a polybutadiene having a number average molecular mass of 1,500 and containing vinyl pendant groups; Lithene Ultra P4-25P, a polybutadiene having a number average molecular mass of 2,600 and containing vinyl pendant groups; Lithene Ultra P4-150P, a polybutadiene having a number average molecular mass of 3,200 and containing vinyl pendant groups; Lithene Ultra N4-5000, a polybutadiene having a number average molecular mass of 5,000 and containing vinyl pendant groups; and Lithene Ultra N4-9000, a polybutadiene having a number average molecular mass of 9,000 and containing vinyl pendant groups.

Suitable functionalized polybutadienes include maleic acid functionalized polybutadienes, such as Lithene Ultra AL-15MA, a maleic acid functionalized polybutadiene having a number average molecular mass of 1,300; Lithene Ultra PM4-7.5MA, a maleic acid functionalized polybutadiene having a number average molecular mass of 1,600; Lithene Ultra N4-5000-15MA, a maleic acid functionalized polybutadiene having a number average molecular mass of 5,750; Lithene Ultra N4-B-10MA, a maleic acid functionalized polybutadiene having a number average molecular mass of 8,200; and Lithene Ultra N4-9000-10MA, a maleic acid functionalized polybutadiene having a number average molecular mass of 9,500.

In another non-limiting embodiment, the at least one film-former may comprise a copolymer. For example, the at least one film-former may comprise a copolymer formed from a first monomer unit and one or more additional monomer units. The first monomer unit may comprise at least four carbon atoms (e.g., from four to six carbon atoms). The one or more additional monomer units may be any copolymerizable monomer, as known to those of skill in the art. For example, the one or more additional monomer units may include vinylaromatic monomer units (e.g., styrene), acrylate monomer units, methacrylate monomer units, acrylonitrile monomer units, and/or olefin monomer units.

Optionally, the at least one film-former may comprise a styrene-butadiene copolymer. An example of a styrene-butadiene copolymer useful as a film-former in a non-limiting embodiment of the present invention comprises Plextol X-9110, commercially available from PolymerLatex GmbH. of Marl, Germany.

Optionally, the at least one film-former may comprise a styrene-acrylate copolymer. An example of a styrene-acrylate copolymer useful as a film-former in a non-limiting embodiment of the present invention comprises Plextol X-4020 and Plextol X-4545, both commercially available from PolymerLatex GmbH. of Marl, Germany.

The sizing composition can include one film former in some embodiments, or multiple film-formers in others. The one or more film-formers are generally present in the sizing composition in an amount of at least 60 weight percent, the percentages based on the total solids of the sizing composition. Optionally, the one or more film-formers are present in the sizing composition in an amount of at least 65 weight percent, at least 70 weight percent, at least 75 weight percent, at least 80 weight percent, or at least 85 weight percent in other embodiments. The one or more film-formers are present in the sizing composition in an amount of up to about 90 weight percent, the percentages based on the total solids of the sizing composition in some embodiments. In some embodiments, the one or more film-formers are present in the sizing composition in an amount of between about 70 and about 85 weight percent.

In some non-limiting embodiments, the sizing composition includes a first film-former and a second film-former, wherein the first film-former comprises a polymer, wherein the repeating unit of the polymer comprises at least four carbon atoms and at least one carbon-carbon double bond (including, for example, any such polymers described above). In one non-limiting embodiment, the first film-former comprises at least about 20 weight percent of the sizing composition on a total solids basis. Optionally, the first film-former can comprise at least about 25 weight percent, at least 30 weight percent, at least 35 weight percent, at least 40 weight percent, or at least 45 weight percent of the sizing composition on a total solids basis in various embodiments.

Suitable second (and other additional) film-formers include, for example, a non-reactive polymer. In some embodiments, the second film-former can include paraffin wax and polymers or copolymers of propylene, ethylene, isobutylene (e.g., polyisobutylene), styrene (e.g., polystyrene), maleic anhydride, acrylate (e.g., polymethylmethacrylate), or combinations thereof. Examples of suitable second film-formers in a non-limiting embodiment of the present invention comprise MichemLub 723, a paraffin wax dispersion commercially available from Michelman, Inc. of Cincinnati, Ohio; Aquacer 1605, a polypropylene dispersion commercially available from Byk of Wesel, Germany; Novacer 1200, a polyethylene dispersion commercially available from Byk; and ML 93135, a polyethylene dispersion commercially available from Michelman, Inc. The second (or additional) film-formers can be present in the sizing composition in an amount of less than about 50 weight percent (e.g., less than about 45 weight percent, less than about 40 weight percent, less than about 30 weight percent, less than about 25 weight percent, or less than about 20 weight percent) on a total solids basis. In some embodiments, a first film-former comprising polybutadiene is present in an amount of at least about 20 weight percent of the sizing composition on a total solids basis and a second film-former comprising paraffin wax is present in an amount of at least about 10 weight percent of the sizing composition on a total solids basis. In other embodiments, a first film-former comprising polybutadiene is present in an amount of at least about 50 weight percent of the sizing composition on a total solids basis and a second film-former comprising paraffin wax is present in an amount of at less than about 45 weight percent of the sizing composition on a total solids basis. In some embodiments, a first film-former comprising polybutadiene is present in an amount of at least about 50 weight percent of the sizing composition on a total solids basis and a second film-former comprising paraffin wax is present in an amount of at less than about 30 weight percent of the sizing composition on a total solids basis. A first film-former comprising polybutadiene is present in an amount of at least about 50 weight percent of the sizing composition on a total solids basis and a second film-former comprising paraffin wax is present in an amount of at less than about 20 weight percent of the sizing composition on a total solids basis in some embodiments.

Sizing compositions of the present invention further comprise one or more silanes. The one or more silanes are capable of reacting or otherwise interacting with cyclic olefinic resins, such as dicyclopentadiene ("DCPD"), during cure. Silanes that are capable of reacting with DCPD, in some non-limiting embodiments, can participate in the polymerization and cross-linking mechanism of the DCPD resin. The silanes can have a relatively low potential to poison the ROMP catalyst. The one or more silanes are also capable of reacting or otherwise interacting with the film-former, such as the polybutadiene film-former described herein.

In some non-limiting embodiments, silanes useful in the sizings of the present invention comprise a terminal vinyl group. As understood to those of skill in the art, a "terminal" vinyl group means that the double bond occurs at the end of the hydrocarbon radical opposite from the end bonded to the silicone atom in the silane.

In some embodiments, suitable silanes comprising a terminal vinyl group can include silanes comprising a vinyl-benzyl group. An example of a commercially available silane comprising a vinylbenzyl group is DYNASYLAN® 1172 N-2-(vinylbenzylamino)-ethyl-3-aminopropyltrimethoxysilane from Degussa AG of Dusseldorf, Germany, which has the following structure:

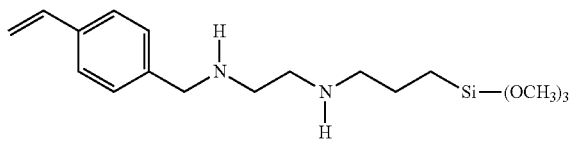

Another example of a commercially available silane comprising a vinylbenzyl group is DYNASYLAN® 1175 from Degussa AG of Dusseldorf, Germany, which is believed to have the same structure as DYNASYLAN® 1172. Another example of a commercially available silane comprising a vinylbenzyl group is Z-6032 N-2-(vinylbenzylamino)-ethyl-3-aminopropyltrimethoxysilane from Dow Corning. DYNASYLAN 1172 is provided in acetic acid while DYNASYLAN 1175 and Z-6032 are provided in hydrochloric acid. Another example of a commercially available silane comprising a vinylbenzyl group is KBM-974, which is a [3-[[2-[(vinylbenzyl)amino]ethyl]amino]propyl]trimethoxysilane commercially available from Shin-Etsu Chemical Co., Ltd. of Tokyo, Japan.

In some non-limiting embodiments, silanes useful in the sizings of the present invention comprise shorter chain silanes having terminal vinyl groups that may provide less adhesion between the fiber glass reinforcement and the polyolefin. Examples of suitable silanes include, for example, vinyltrialkoxysilanes. In some embodiments, a suitable vinyltrialkoxysilane includes Silquest A-151, a vinyltriethoxysilane commercially available from Momentive Performance Materials, Inc. (Columbus, Ohio). A further example of a suitable silane, in some embodiments, includes methacryloxypropyltrialkoxy silanes such as 3-methacryloxypropyltrialkoxysilane, commercially available as Silquest A-174 from Momentive Performance Materials, Inc. (Columbus, Ohio).

In another non-limiting embodiment, a silane useful in a sizing of the present invention comprises a norbornenyl-functional silane. Norbornenyl-functional silanes useful in the present invention may include, for example, norbornenyl trimethoxysilanes and norbornenyl triethoxysilanes having four or more carbon atoms in a chain between the silicon atom and the norbornenyl group.

Other potentially useful silanes may include carbons in the chain having functional groups attached, although any such functionality would preferably not poison the ROMP catalyst. Examples of undesirable functional groups are set forth above in connection with the film-former. Such undesirable functional groups may, for example include: primary amines, thiols, terminal epoxides, hydroperoxides, activated epoxides, acetylenes, and vinyl ethers.

The at least one silane can generally be present in the sizing composition in an amount from at least about 5 weight percent up to about 25 weight percent, the percentages based on the total solids of the sizing composition. The at least one silane, in a further non-limiting embodiment, may be present in an amount from 5 weight percent to 15 weight percent or from 10 weight percent to 20 weight percent, the percentages based on the total solids of the sizing composition.

Embodiments of sizing compositions of the present invention may comprise multiple silanes as described herein. In these embodiments, at least one of the silanes is capable of reacting with cyclic olefinic resins, such as dicyclopentadiene ("DCPD"), during cure. When multiple silanes are used, each silane can have a low potential to poison the ROMP catalyst (e.g., react with the ROMP catalyst to produce a species that is not a catalyst). The potential to avoid poisoning the ROMP catalyst can be avoided by not using silanes that include, for example, the following functional groups: primary amines, thiols, terminal epoxides, hydroperoxides, activated epoxides, acetylenes, and vinyl ethers.

Depending on the particular film-former used, one or more emulsifying agents or surfactants may be used to assist in dispersing the film-former in water or an aqueous solution. Emulsifying agents can also assist in emulsifying or dispersing other components of the sizing compositions in some embodiments. For example, when the film-former comprises a polymer, wherein the repeating unit of the polymer comprises at least four carbon atoms and at least one carbon-carbon double bond (including, for example, any such polymers described above), it may be beneficial to utilize one more emulsifying agents or surfactants to assist in dispersing the polymer in an aqueous sizing composition.

Non-limiting examples of suitable emulsifying agents can include polyoxyalkylene block copolymers, ethoxylated alkyl phenols, polyoxyethylene octylphenyl glycol ethers, ethylene oxide derivatives of sorbitol esters, polyoxyethylated vegetable oils, ethoxylated alkylphenols, and nonylphenol surfactants. Examples of commercially available emulsifying agents useful in embodiments of the present invention can include Pluronic F-108, which is a polyoxyalkylene block copolymer and which is commercially available from BASF Corp. (Florham Park, N.J.); Alkamuls EL-719, which is an ethoxylated castor oil and which is commercially available from Rhodia (Courbevoie, France); Genapol UD 050 from Clariant Corporation of Mt. Holly, N.C.; and Lutensol OP-10, which is an octylphenol ethoxylate and which is commercially available from BASF Corp.

As indicated above, embodiments of the present invention can utilize one or more emulsifying agents or surfactants. Multiple emulsifying agents can be used in some embodiments to assist in providing a more stable emulsion. Multiple emulsifying agents can be used in amounts effective to disperse hydrophobic components, such as certain film-formers, in water or an aqueous solution. For example, when the film-former comprises a polymer, wherein the repeating unit of the polymer comprises at least four carbon atoms and at least one carbon-carbon double bond (including, for example, any such polymers described above), it may be beneficial to utilize multiple emulsifying agents or surfactants to assist in dispersing the polymer in an aqueous sizing composition. In some non-limiting embodiments of sizing compositions that include one or more emulsifying agents or surfactants, the total amount of emulsifying agents or surfactants can comprise up to 20 weight percent of the sizing composition based on total solids. In other non-limiting embodiments, the total amount of emulsifying agents can comprise up to 17 weight percent of the sizing composition based on total solids. In other non-limiting embodiments, the total amount of emulsifying agents can comprise up to 16 weight percent of the sizing composition based on total solids. In some embodiments, the total amount of emulsifying agents can comprise 10 or more weight percent of the sizing composition based on total solids. The total amount of emulsifying agents, in some embodiments, can comprise between 10 and 20 weight percent of the sizing composition based on total solids.

In some non-limiting embodiments, sizing compositions of the present invention may further include one or more antioxidants. One or more antioxidants can be used in some embodiments to prevent oxidative drying of film-formers in dried products. The one or more antioxidants can also be useful in suppressing skin formation and discoloration of certain film-formers, such as polybutadiene and similar film-formers. Non-limiting examples of suitable antioxidants can include sterically hindered phenols, hindered amine light stabilizers (HALS), and phosphites. Examples of commercially available antioxidants useful in embodiments of the present invention can include butylated hydroxytoluene (BHT); sodium hypophosphite; N,N'-diphenyl-p-phenylenediamine (DPPD), commercially available from Westco (Western Reserve Chemical Corporation, Stow, Ohio); ethylenebis(oxyethylene)bis[3-(5-tert-butyl-4-hydroxy-m-tolyl)propionate], commercially available as Irganox 245 from BASF; 4,6-bis(octylthiomethyl)-o-cresol, commercially available as Irganox 1520 from BASF; 4,6-bis(dodecylthiomethyl)-o-cresol, commercially available as Irganox 1726 from BASF; Octadecyl-3-(3,5-di-tert.butyl-4-hydroxyphenyl)-propionate, commercially available as Irganox 1076 from BASF; Irgastab PVC 76, a heat stabilizer commercially available from BASF; tris(2,4-ditert-butylphenyl)phosphite, commercially available as Irgafos 168 from BASF; Tinuvin 765, a liquid hindered amine light stabilizer commercially available from BASF; Aquanox TD, a water-based antioxidant commercially available from Aquaspersions Ltd. (Halifax, United Kingdom); and Chimasorb 119, a hindered amine light stabilizer commercially available from Sabo S.p.A. (Levate, Italy). Non-limiting examples of phosphites that can be used in some embodiments of the present invention also include those disclosed in U.S. Pat. No. 6,207,737, which is hereby incorporated by reference.

The one or more antioxidants can generally be present in the sizing composition in an amount of up to about 10 weight percent based on the total solids of the sizing composition. The one or more antioxidants, in a further non-limiting embodiment, may be present in an amount from 0.1 weight percent to 10 weight percent or from 1 weight percent to 5 weight percent, the percentages based on the total solids of the sizing composition.

In addition to at least one film-former and at least one silane, sizing compositions of the present invention may further comprise one or more lubricants. In one non-limiting embodiment, the lubricant comprises at least one non-ionic lubricant. As used herein, the term "non-ionic" is used in a manner normally appreciated by those of ordinary skill in the art. Non-ionic lubricants useful in embodiments of the present invention preferably do not include reactive groups or other structures that might poison the ROMP catalyst or negatively affect the polymerization of the cycloolefins as described herein.

Examples of non-ionic lubricants useful in embodiments of the present invention comprise ethoxylated fatty alcohols, such as ethoxylated monooleate, ethoxylated di-oleate, ethoxylated monotallate and ethoxylated di-tallate. An example of a suitable ethoxylated di-tallate is available from BASF Corporation under the product name MAPEG 600 DOT. MAPEG 600 DOT is a polyethylene glycol ditallate having an average molecular weight of 600. An example of a suitable ethoxylated di-oleate is available from BASF Corporation under the product name MAPEG 600 DO. MAPEG 600 DO is a polyethylene glycol di-oleate having an average molecular weight of 600. Other examples of ethoxylated di-tallates and ethoxylated di-oleates, as well as ethoxylated monooleates and ethoxylated monotalates, are also available from BASF Corporation under the MAPEG product line. A further example of a non-ionic lubricant useful in embodiments is polyethylene glycol monolaurate, which is commercially available from The HallStar Company as HALLSTAR PEG 600 ML.

The at least one non-ionic lubricant can generally be present in the sizing composition in an amount from 10 weight percent to 55 weight percent, the percentages based on the total solids of the sizing composition. The at least one non-ionic lubricant, in a further non-limiting embodiment, may be present in an amount from 25 weight percent to 35 weight percent, the percentages based on the total solids of the sizing composition.

The sizing composition of the present invention may further comprise at least one cationic lubricant. In another non-limiting embodiment, the sizing composition may comprise at least one cationic lubricant without a non-ionic lubricant. As used herein, the term "cationic" is used in a manner normally appreciated by those of ordinary skill in the art. Cationic lubricants advantageously protect against fiber-to-fiber abrasion. In one non-limiting embodiment, the concentration of the cationic lubricant is sufficiently low to avoid poisoning the ROMP catalyst. While the cationic lubricant may include functional groups that may poison the ROMP catalyst (e.g., secondary amines), some cationic lubricant may be needed to protect against fiber-to-fiber abrasion. Accordingly, embodiments may use cationic lubricants in amounts that protect against fiber-to-fiber abrasion without significantly affecting the function of the ROMP catalyst.

The loss on ignition of the cationic lubricant in one non-limiting embodiment is 0.01% or less. While generally most cationic lubricants used in fiber glass sizing compositions will be suitable for use in the present invention, examples of cationic lubricants useful in non-limiting embodiments of the present invention include carboxylic acid salts of amidoamines. Examples of suitable carboxylic acid salts of amidoamines include Emery 6717L, available from Cognis Corporation, Cat X available from Rhone Poulenc, and Alubraspin 261 available from BASF Corp. Further examples of suitable cationic lubricants include Lubril Cat-X/VC, commercially available from Rhodia of Cranbury, N.J., and Katax 6717, commercially available from Pulcra Chemical of Geretsried, Germany.

The at least one cationic lubricant may be present in the sizing composition in an amount from 0 weight percent to 5 weight percent, the percentages based on the total solids of the sizing composition. Smaller amounts of amine-containing cationic lubricants may be used in such embodiments due to the potential to poison the ROMP catalyst in some embodiments. In some non-limiting embodiments, the at least one cationic lubricants may be generally present in the sizing composition in an amount from 0 weight percent to 2 weight percent, the percentages based on the total solids of the sizing composition. The at least one cationic lubricant, in other non-limiting embodiments, may be generally present in the sizing composition in an amount from 0 weight percent to 1 weight percent, the percentages based on the total solids of the sizing composition.

The sizing composition of the present invention may further comprise at least one anionic lubricant. In another non-limiting embodiment, the sizing composition may comprise at least one anionic lubricant without a cationic lubricant or a non-ionic lubricant. As used herein, the term "anionic" is used in a manner normally appreciated by those of ordinary skill in the art. Example of a suitable anionic lubricant for use in the present invention include partial esters of a branched carboxylic acid copolymer, such as Ketjenlube 522 partial ester (also sold as Dapral GE202). Ketjenlube 522 partial ester is commercially available from Akzo Chemie America of Chicago, Ill.

The sizing composition can also optionally contain other ingredients which are known to those skilled in the art to be useful in fiber glass sizing compositions, such as antifoaming agents, biocides, humectants and the like. The sizing composition can be prepared by any method known to those skilled in the art, and applied to the fibers and/or fillers by any method known in the art.

The present invention also relates to fiber glass products comprising a plurality of glass fibers at least partially coated with a sizing composition of the present invention. In one non-limiting embodiment, the fiber glass product is a fiber glass strand. The fiber glass strand may be wound into a cylindrical package and dried using techniques known to those of ordinary skill in the art. These individual packages may be shipped to a composite manufacturer to make a reinforced composite. Composite manufacturers typically use strands from a plurality of packages to make a composite. In another non-limiting embodiment, a glass fiber strand may be directly wound into a fiber glass roving, dried, and shipped to a composite manufacturer. In non-limiting embodiments, a roving may comprise 4000 or more fibers, the fibers having diameters between 13 and 35 microns. In other non-limiting embodiments, the rovings are assembled rovings comprising as many as 10,000 or more fibers, the fibers having diameters between 10 and 23 microns. In some applications, chopped fiber glass strands and fiber glass mats can be used.

In non-limiting embodiments of the present invention, the loss on ignition of the sizing on the fiber glass can generally be between 0.1 and 2.0%. In other non-limiting embodiments, the loss on ignition can generally be between 0.1 and 1.5%. The loss on ignition of the sizing on the fiber glass, in other non-limiting embodiments, can generally be between 0.1% and 0.8%.

The present invention also relates to methods of forming a plurality of glass fibers having sizings of the present invention applied thereon. Any glass fiber suitable for reinforcing can suitably be treated in accordance with the present invention. Non-limiting examples of glass fibers suitable for use in the present invention can include those prepared from fiberizable glass compositions such as "E-glass", "A-glass", "C-glass", "S-glass", "ECR-glass" (corrosion resistant glass), and fluorine and/or boron-free derivatives thereof.

The glass fibers of the present invention can be formed in any suitable method known in the art, for forming glass fibers. For example, glass fibers can be formed in a direct-melt fiber forming operation or in an indirect, or marble-melt, fiber forming operation. In a direct-melt fiber forming operation, raw materials are combined, melted and homogenized in a glass melting furnace. The molten glass moves from the furnace to a forehearth and into fiber forming apparatuses where the molten glass is attenuated into continuous glass fibers. In a marble-melt glass forming operation, pieces or marbles of glass having the final desired glass composition are preformed and fed into a bushing where they are melted and attenuated into continuous glass fibers. If a premelter is used, the marbles are fed first into the premelter, melted, and then the melted glass is fed into a fiber forming apparatus where the glass is attenuated to form continuous fibers. In the present invention, the glass fibers can be formed by the direct-melt fiber forming operation.

For additional information relating to glass compositions and methods of forming the glass fibers, see K. Loewenstein, *The Manufacturing Technology of Continuous Glass Fibres*, (3d Ed. 1993), at pages 30-44, 47-103, and 115-165, which are specifically incorporated by reference herein. Immediately after formation, the filaments are at least partially coated with an embodiment of the sizing composition described above. The application of sizing to glass fibers is well known in the art and can be accomplished by conventional methods such as a belt applicator, a "kiss-roll" applicator or by spraying. The glass fibers are then gathered into at least one strand, and collected into a forming package on a winder. See generally K. Loewenstein, *The Manufacturing Technology of Continuous Glass Fibres*, (3d Ed. 1993).

The present invention also relates to polyolefin composites reinforced with sized glass fibers, wherein the sizing comprises a sizing composition of the present invention. In one non-limiting embodiment, the polyolefin comprises polymers formed from cyclic olefins. In a further non-limiting embodiment, the cyclic olefins are cured by ROMP catalysts. In another non-limiting embodiment, the polyolefin comprises polymers formed from DCPD. In a further non-limiting embodiment, the DCPD monomer is cured by ROMP catalysts. In another non-limiting embodiment, the sizing compositions of the present invention can be used to at least partially coat glass fibers for use in reinforcing composites formed through other unsaturated polymerization reactions, such as reactions involving unsaturated polyesters, acrylics, and the like, as known to those of skill in the art.

In embodiments where the composite comprises polymers formed from cyclic olefins, such as pDCPD, glass fibers comprising embodiments of sizing compositions of the present invention can be added to a curable composition. The curable composition can comprise, in some such embodiments, a cyclic olefin (e.g., DCPD), a metathesis catalyst for polymerizing the cyclic olefin, a modifier compound, and a curing agent for the modifier compound. The modifier compound can be present in the curable composition in amount between about 0.1 and 30 weight percent based on the total weight of the composition in some embodiments. The modifier compound, in some embodiments, can be present in the curable composition in amount between about 3 and 20 weight percent based on the total weight of the composition. The curing agent can be present in an amount between about 0.1 and about 10 weight percent based on the total weight of the curing composition in some embodiments. The curing agent, in some embodiments, can be present in an amount between about 0.2 and about 1 weight percent based on the total weight of the curing composition. The curing agent can comprise a radical initiator such as a non-cyclic peroxide in some embodiments. In some embodiments, the curable composition comprises a cyclic olefin (e.g., DCPD), a metathesis catalyst for polymerizing the cyclic olefin, 0.1-30 wt. % of a modifier compound based on the total weight of the composition, and 0.1-10 wt. % of a curing agent for the modifier compound based on the total weight of the composition. Composites formed from such curable compositions and glass fibers at least partially coated with sizing compositions of the present invention can be formed using techniques known to those of skill in the art.

In other non-limiting embodiments, composites of the present invention have a bonding strength of greater than 4,000 pounds per square inch (psi) as determined by short-beam shear (SBS) testing. In other non-limiting embodiments, the composites have a bonding strength of greater than 5,000 psi as determined by SBS testing. Composites of the present invention, in other non-limiting embodiments, have a bonding strength of greater than 6,000 psi as determined by SBS testing.

It was observed that composites utilizing rovings coated with sizings of the present invention can exhibit improved glass-matrix resin bonding strengths over composites utilizing conventional fiber glass reinforcements. Short-beam shear testing in accordance with ASTM 2344 is one way in which glass-matrix resin bonding strength can be measured.

Embodiments of the present invention will now be illustrated in the following specific, non-limiting examples.

EXAMPLES

Sizing compositions were prepared in accordance with the formulations set forth in Table 1. These formulations represent non-limiting embodiments of sizing compositions of the present invention. Example 1 is one embodiment of a sizing composition that can be used, for example, on glass fibers in applications where a strong level of adhesion is desired. Example 2 is another embodiment of a sizing composition that can be used, for example, on glass fibers in applications where a less strong level of adhesion to a substrate, such as in ballistics operations, is desired.

TABLE 1

| Component | 1 | 2 |
|---|---|---|
| Silane A with vinylbenzyl[1] | 3709 g (15.5%) | |
| Silane B with terminal vinyl[2] | | 2360 g (15.5%) |
| Polybutadiene Polymer[3] | 6584 g (77.3%) | 6584 g (77.3%) |
| Emulsifying Agent[4] | 307 g (3.6%) | 307 g (3.6%) |
| Nonionic Surfactant[5] | 307 g (3.6%) | 307 g (3.6%) |
| Water for Polybutadiene Polymer Emulsion | 13169 g | 13169 g |
| Total Mix Amount | 56775 g | 56775 g |
| Total Percent Solids | 15% | 15% |

[1]DYNASYLAN 1175 from Degussa AG.
[2]SILQUEST A-151 from Momentive Performance Materials, Inc.
[3]LITHENE P4-25P from Synthomer, Inc.
[4]PLURONIC F-108 polyoxyalkylene block copolymer from BASF Corp.
[5]GENAPOL UD 050 from Clariant Corporation.

Additional formulations representing non-limiting embodiments of sizing compositions of the present invention are provided in Tables 2 and 3 as Examples 3-15.

TABLE 2

| Component | 3 | 4 | 5 | 6 | 7 | 8 | 9 |
|---|---|---|---|---|---|---|---|
| Silane A with vinylbenzyl[6] | | | 98.6 g (15.5%) | 493.0 g (47.8%) | 98.6 g (11.8%) | 98.6 g (15.5%) | 98.6 g (16.7%) |

TABLE 2-continued

| Component | 3 | 4 | 5 | 6 | 7 | 8 | 9 |
|---|---|---|---|---|---|---|---|
| Silane B with terminal vinyl[7] | 62.7 g (15.5%) | 313.6 g (47.8%) | | | | | |
| Polybutadiene Polymer A[8] | | | | | | 175 g (77.3%) | |
| Polybutadiene Polymer B[9] | 175 g (77.3%) | 175 g (47.8%) | 175 g (77.3%) | 175 g (47.8%) | | | |
| Polybutadiene Polymer C[10] | | | | | 175 g (59.2%) | | |
| Styrene-butadiene Copolymer[11] | | | | | | | 350 g (83.3%) |
| Emulsifying Agent[12] | 8.2 g (3.6%) | 8.2 g (2.2%) | 8.2 g (3.6%) | 8.2 g (2.2%) | | 8.2 g (3.6%) | |
| Nonionic Surfactant[13] | 8.2 g (3.6%) | 8.2 g (2.2%) | 8.2 g (3.6%) | 8.2 g (2.2%) | | 8.2 g (3.6%) | |
| Water for Polybutadiene Polymer emulsion | 350 g (0%) | 350 g (0%) | 350 g (0%) | 350 g (0%) | | 350 g (0%) | |
| Hot Water for Polybutadiene Polymer solution[14] | | | | | 4375 g (0%) | | |
| Ammonia (25%) | | | | | 343 g (29.0%) | | |
| Total Mix Amount | 7000 g | 7000 g | 7000 g | 7000 g | 7000 g | 7000 g | 7000 g |
| Total Percent Solids | 3.23% | 5.23% | 3.23% | 5.23% | 4.23% | 3.23% | 3.00% |

[6]DYNASYLAN 1175 from Degussa AG.
[7]SILQUEST A-151 from Momentive Performance Materials, Inc.
[8]LITHENE P4-25P from Synthomer, Inc.
[9]LITHENE P4-150P from Synthomer Inc.
[10]LITHENE AL-15MA from Synthomer Inc.
[11]PLEXTOL X9110 from PolymerLatex GmbH.
[12]SYNPERONIC PE/F108 ethoxylated polypropylene oxide from Croda International.
[13]Blend MPG (monopropylene glycol) from Chemische Werke Kluthe GMBH.

TABLE 3

| Component | 10 | 11 | 12 | 13 | 14 | 15 |
|---|---|---|---|---|---|---|
| Silane A with vinylbenzyl[15] | 84.5 g (15.5%) | | | | 42.2 g (7.7%) | |
| Silane B with terminal vinyl[16] | | 53.7 g (15.5%) | | | | |
| Silane C (3-methacryloxypropyl-trimethoxysilane)[17] | | | 36.1 g (15.5%) | | | |
| Silane D (octenyl)[18] | | | | 75 g (15.5%) | 37.5 g (7.7%) | |
| Silane E (norbornenyl silane) | | | | | | 36.3 g (15.5%) |
| Polybutadiene Polymer[19] | 150 g (77.3%) | 150 g (77.3%) | 150 g (77.3%) | 150 g (77.3%) | 150 g (77.3%) | 150 g (77.3%) |
| Emulsifying Agent[20] | 7.0 g (3.6%) | 7.0 g (3.6%) | 7.0 g (3.6%) | 7.0 g (3.6%) | 7.0 g (3.6%) | 7.0 g (3.6%) |
| Nonionic Surfactant[21] | 7.0 g (3.6%) | 7.0 g (3.6%) | 7.0 g (3.6%) | 7.0 g (3.6%) | 7.0 g (3.6%) | 7.0 g (3.6%) |
| Water for Polybutadiene Polymer Emulsion | 300 g | 300 g | 300 g | 300 g | 300 g | 300 g |
| Total Mix Amount | 6000 g | 6000 g | 6000 g | 6000 g | 6000 g | 6000 g |
| Total Percent Solids | 3.23 | 3.23 | 3.23 | 3.23 | 3.23 | 3.23 |

[14]Hot water is at 82° C.
[15]DYNASYLAN 1175 from Degussa AG.
[16]SILQUEST A-151 from Momentive Performance Materials, Inc.
[17]DYNASYLAN MEMO from Degussa AG.
[18]SILBLOCK WMS from Momentive Performance Materials, Inc.
[19]LITHENE P4-25P from Synthomer, Inc.
[20]SYNPERONIC PE/F108 ethoxylated polypropylene oxide from Croda International.
[21]Blend MPG (monopropylene glycol) from Chemische Werke Kluthe GMBH.

Preparation of Sizing Compositions

To prepare the sizing compositions shown as Examples 1-6, 8, and 10-15 in Tables 1-3, the specified amount of the Polybutadiene Polymer, Emulsifying Agent, and Nonionic Surfactant were added to a side mix tank. The contents were heated to 150° F. Under high shear mixing conditions, the indicated amount of hot deionized water was slowly added to the side mix tank. During the water addition, the mixture inverted from a water-in-oil emulsion to an oil-in-water emulsion. For Example 7, Polybutadiene Polymer C was added under continuous stirring to a side mix tank containing the indicated amounts of hot water and ammonia to form a clear solution that was added to the main mix tank. The Styrene-butadiene Copolymer of Example 9 was supplied as an emulsion that was directly added to the main mix tank.

For all examples, deionized water was added to the main mix tank and, while agitating, the specified amount of Silane was added. The Silane was mixed until hydrolysis occurred (approximately 30 minutes). The contents of the side mix tank were then added to the main mix tank, while stirring. The main mix tank was then agitated while enough deionized water was added to bring the sizing composition to its desired volume.

Preparation of Fiber Glass Strands

Each of the sizing compositions in Tables 1-3 was applied to a fiber glass strand in the following manner. Fiber glass filaments, having a nominal filament diameter of 16 microns were formed using a bushing and then at least partially coated with one of the sizing compositions in Tables 1-3 using a sizing applicator. The nominal loss on ignition of the fiber glass was 0.5 weight percent. The fiber glass filaments were gathered into a strand and then wound into a forming package on a winder. For Examples 1 and 2, each strand comprised 4,000 filaments with a nominal weight of 1984 tex. The strands were dried using dielectric drying. For Examples 3-15, each strand comprised 1,200 filaments with a nominal weight of 600 tex. The strands were dried at 40° C.

Measurement of Mechanical Properties for Examples 1 and 2

Two types of glass fibers were used: Sample 1, at least partially coated with sizing composition Example 1 from Table 1 and which is compatible with pDCPD resin and Comparative Example A, at least partially coated with PPG's commercial 1383 binder and which is compatible with epoxy resin. The nominal loss on ignition of the fiber glass was 0.55 weight percent. Both types of glass were prepared as rovings (direct draw) from fibers having a nominal filament diameter of 16 microns that had a nominal weight of 1984 tex. The rovings were dried using dielectric drying. A plurality of the rovings were woven into a plain woven fabric with an areal density of 827 g/m². The matrix materials used were a pDCPD formulation (indicated below as F2.06), supplied by Telene SAS, and a standard epoxy resin (Epikote 828 LVEL with Dyteck DCH 99 hardener).

Unidirectional (UD) samples for bending tests were produced by means of a hand pultrusion process by pulling impregnated fiber bundles through a mold. Woven fabric laminates were produced by vacuum infusion of 4 layers of glass fiber weave with the F2.06 pDCPD resin and also with the epoxy resin. The composite fiber volume fractions for the different types of samples are in Table 4.

TABLE 4

|  | pDCPD F2.06 - Sample 1 | pDCPD F2.06 - Comparative Example A | Epoxy - Comparative Example A |
|---|---|---|---|
| Transverse 3 pb samples | 0.59 | 0.61 | 0.56 |
| Woven laminates | 0.53 | / | 0.56 |

Adhesion Assessment with Three Point Bending Test

Transverse three point bending (3pb) tests on unidirectional samples were done according to the ISO 14125 standard to provide an indication of the quality of the bond between fibers and matrix, for three combinations of fiber sizing/matrix: the Sample 1 glass combined with the F2.06 pDCPD matrix, and the Comparative Example A glass, combined with the epoxy matrix, as well as with the F2.06 pDCPD resin. A crosshead displacement rate of 1 mm/min was used.

To investigate the quality of the fiber-matrix adhesion of the pDCPD F2.06/Sample 1 glass combination as compared to the epoxy/Comparative Example A glass combination, which is known to have sufficient adhesion, a series of transverse three point bending tests was done on unidirectional samples. For completion, this was also done on pDCPD F2.06/Comparative Example A composites. Visual inspection of the latter samples suggested poor impregnation quality, but they were still tested for completeness.

Table 5 shows the average obtained transverse three-point bending strength for the three materials. The obtained strength for all three materials was significantly different. The highest values were obtained for the F2.06/Sample 1 combination, followed by the EP/Comparative Example A combination. Since the latter is known to have good adhesion, adhesion between fibres and matrix in the pDCPD F2.06/T73 material can therefore be considered to be also very good.

TABLE 5

| Material | Matrix | Glass fibre type | Three point bending strength (MPa) |
|---|---|---|---|
| F2.06/Sample 1 | pDCPD F2.06 | Sample 1 (pDCPD compatible) | 102 ± 14 |
| F2.06/Comparative Example A | pDCPD F2.06 | Comp. Example A (epoxy compatible) | 19 ± 7 |
| EP/Comparative Example A | Epikote 828 LVEL | Comp. Example A (epoxy compatible) | 81 ± 7 |

Tensile Tests

Samples cut from the woven fabric laminates by water-cooled diamond saw, were used for static and fatigue tensile tests according to the ASTM D3039 and D3479 standards. Strain measurements during the static tests were done by means of digital image correlation. A test speed of 2 mm/min was used. Fatigue tests were done in load-controlled mode on a 160 kN hydraulic Schenck. The fatigue frequency was 5 Hz, and the R-ratio was 0.1. The chord modulus was determined as the ratio of the difference in load over the difference in displacement for each cycle.

TABLE 6

| Material | Tensile strength (MPa) | Tensile modulus (GPa) | Failure strain (%) |
|---|---|---|---|
| pDCPD F2.06/ Sample 1 | 516 ± 14 | 23 ± 2 | 2.7 ± 0.1 |
| Epoxy/Comparative Example A | 502 ± 33 | 26 ± 3 | 2.9 ± 0.1 |

The results from the tensile tests on the woven fabric composite samples are shown in Table 6. Final failure was in the gauge section for all tested samples. No significant difference between the two materials was measured in terms of stiffness or strength. The failure strain for the epoxy samples was found to be marginally larger than that of the pDCPD composite. This may be explained by the pronounced loss in stiffness of the epoxy samples near the end of the test, caused by the build-up of extensive delamination damage.

Pictures taken during the test with transmitted light do reveal a markedly different damage development. FIG. 1 shows transmitted light pictures taken during the tensile tests for different percentages of strain for both materials. The pDCPD composite does not show much damage up to around 1% of strain, after which a limited amount of short, localized transverse and longitudinal cracks start to develop. The first signs of the onset of delamination are in the second to last picture, which was taken approximately 1 second before failure (called JBF in the figure). Final failure is very localized and consists of fiber failure with a very limited amount of delamination. In the epoxy composites, however, after 0.5% of strain a multitude of transverse matrix cracks can already be seen. Not only are they more numerous, they are also longer and were seen to grow very quickly over the full width of the sample. The number of transverse cracks increases rapidly with increasing strain. Between 1 and 2% of strain, longitudinal cracks were found to develop. The first delaminations occur between 2 and 2.5% of strain and are localized on the 'cross-over' points of the fiber bundles (as may be expected in a woven fabric laminate). Many delaminations are formed, which grow and coalesce and finally cause final failure by extensive delamination and fiber failure.

Figure 2:
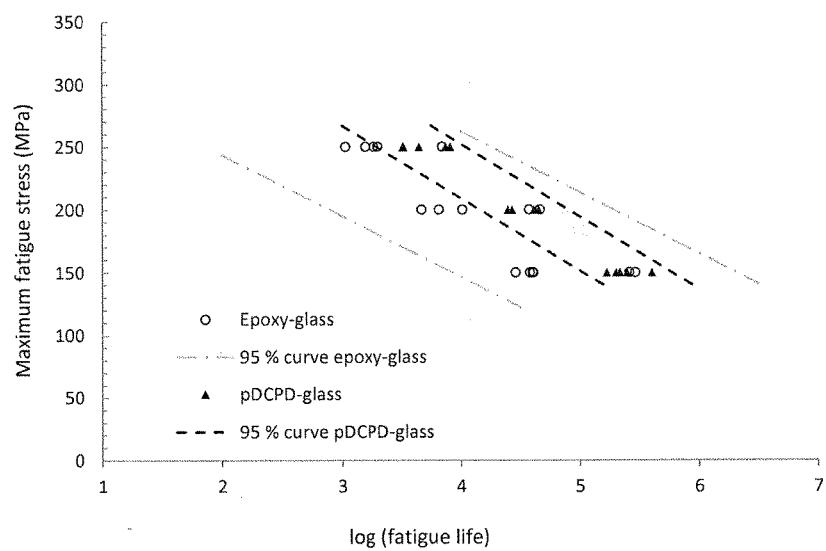
FIG. 2 shows the fatigue life data and the 95/95 interval for the two materials. The lower bound line of these intervals indicates the lower limit of the region containing with 95% confidence 95% of all future test results.

Tensile fatigue tests were run at load levels of 250, 200 and 150 MPa. Since the tensile strength of both materials was approximately 500 MPa, this corresponds to 50, 40 and 30% of the tensile strength. At least five samples of each material were tested for each load level. The fatigue life data are shown on the graph of FIG. 2. As opposed to the static tests, a relatively high percentage (about 65%) of fatigue samples did not fail in the gauge area, but rather close to or in the end tabs. There was, however, no clear difference in fatigue life between samples that failed at the tabs and samples that did not.

As shown in the data, no statistical significant difference in fatigue life was found between the two materials, although the fatigue life data for the pDCPD composite clearly seems to be situated in the higher end of the epoxy composite results range.

For all tested load levels, the variation in fatigue life for the pDCPD composite is much smaller than that for the epoxy composite. For a certain fatigue load level, the difference between the lowest and highest observed fatigue life is about a factor ten for the epoxy composite (i.e., one order of magnitude, which is in line with what is commonly observed for epoxy composites), while for the pDCPD laminate this difference is less than a factor three.

Because of these observations, for both materials the 95% confidence interval was determined. The 95% interval is also indicated on FIG. 2. The bottom dashed line of these intervals indicates the lower limit of the region containing with 95% confidence 95% of all future fatigue test results for this material. Examination of these curves shows a very clear difference between the two materials, as suggested already by the above observations. This so-called 95/95 fatigue life is clearly much higher for the pDCPD composite than for the epoxy composite.

Figure 3:
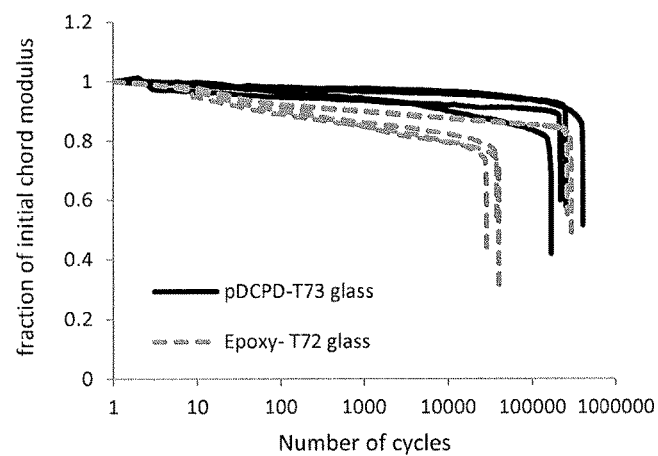
FIG. 3 is a graph showing the evolution of the chord modulus of samples tested in fatigue up to 150 MPa.

The graph in FIG. 3 shows the evolution of the chord modulus during fatigue at 150 MPa (30% of the tensile strength). The chord modulus is the ratio of (maximum load-minimum load)/(maximum position-minimum position) for each cycle. The evolution of this modulus may be seen as representative for the evolution in the stiffness of the sample during fatigue. The graph indicates that the reduction in modulus for the epoxy samples is more pronounced than for the pDCPD samples.

Figure 4A:
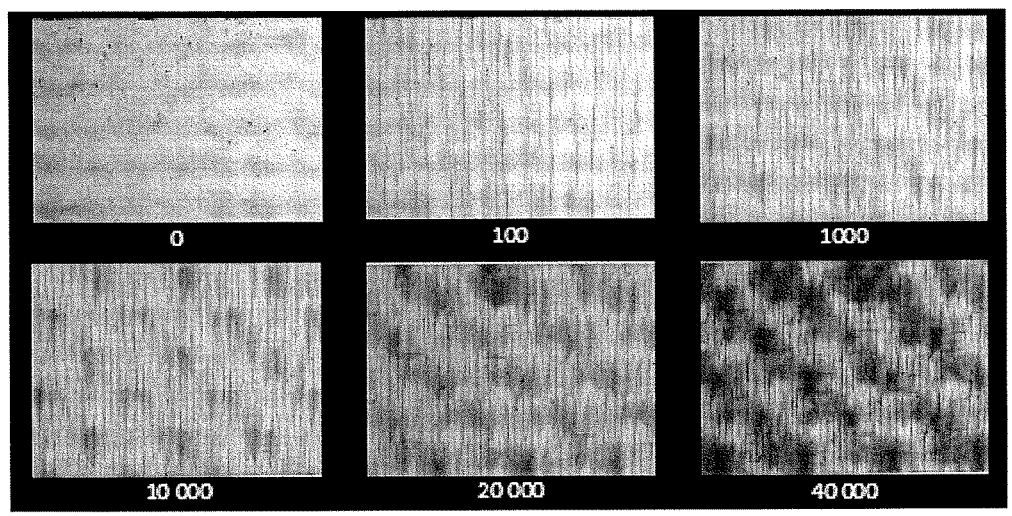
FIG. 4 shows transmitted light pictures at certain numbers of cycles in fatigue tests up to 150 MPa, illustrating the fatigue damage evolution for the epoxy-glass sample (FIG. 4a) which failed at 40567 cycles, and the pDCPD-glass sample (FIG. 4b) which failed at 200 107 cycles. (Loading direction in these pictures is horizontal).
Figure 4B:
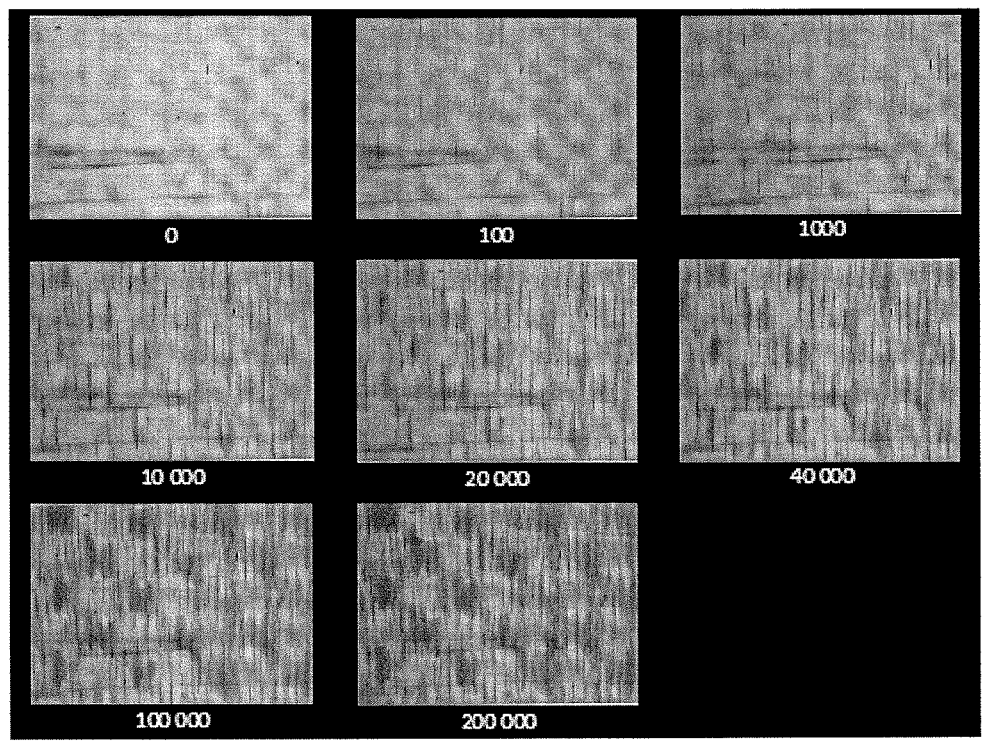

This is supported by the observed evolution of damage in this type of samples during tensile fatigue as shown in FIG. 4. After 100 cycles, clear transverse cracks can already be seen in the epoxy composite. At this moment, only a very limited amount of short, localised cracks is found in the pDCPD composite. As the number of cycles increases, short longitudinal cracks are also created. After around 1,000 cycles, the onset of local delamination from the cracks is observed for the epoxy composite, while in the pDCPD composite there is no sign of delaminations at that time. At 10,000 cycles, starting delaminations are also observed in the pDCPD composite. As the number of cycles increases, extensive areas of delaminations are formed in the epoxy composite, while the progression of this type of damage seems to be much slower in the pDCPD composite. This explains the smaller decrease in the chord modulus observed for the latter material. The overall damage evolution in the two materials is in general very similar to that during a static tensile test, although there does seem to be a slightly higher degree of (localised) delamination in the pDCPD composite during fatigue than during static testing.

Drop Weight Impact Tests

Drop weight impact tests were done on 10×10 cm$^2$ samples cut from the woven laminates with a semi-hemispherical impacter with a diameter of 16 mm and a weight of 3.120 kg. The drop height was 49 cm and 81.5 cm, i.e., a potential impact energy of 15 and 25 joules, respectively. Assessment of the impact damage was done by means of visual inspection with the aid of transmitted light, as well as by ultrasonic C-scan.

Figure 5:
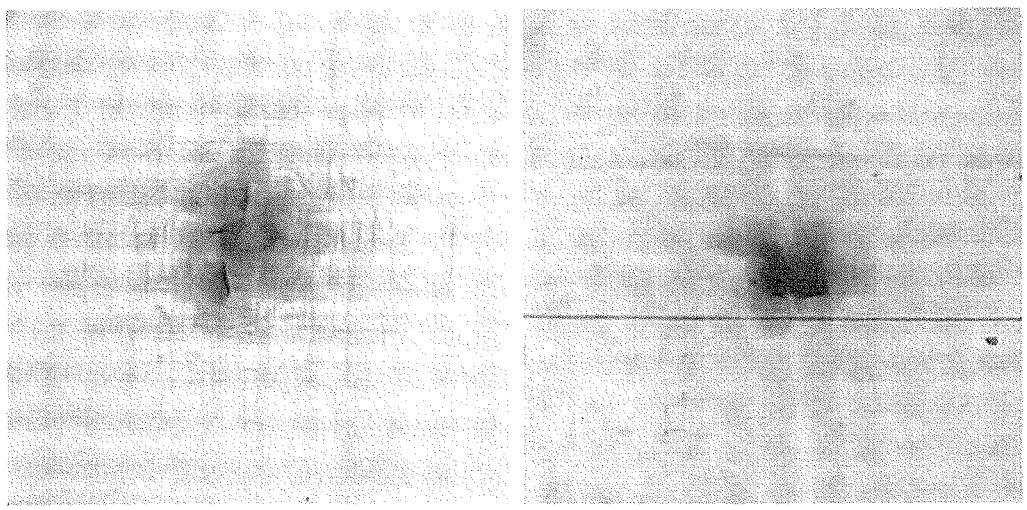
FIG. 5 shows a transmitted light photograph of an epoxy/Comparative Example A sample (left) and a pDCPD F2.06/Sample 1 (right) sample impacted with an energy of 25 J. The scale for both pictures is the same.

Drop weight impact tests were performed on the pDCPD F2.06/Sample 1 and epoxy/Comparative Example A laminates with impact energies of 15 and 25 joules. Due to the transparent nature of the samples, visual inspection of the impact damage was possible. An example of a transmitted light photograph of two specimens impacted with an energy of 25 J is shown in FIG. 5. For both energy levels, this inspection clearly showed that the damage in the epoxy laminates is more severe than that in the pDCPD laminates. A central delaminated region with a very limited amount of fibre damage is visible on the impact site. In the epoxy samples this region is surrounded by matrix cracks. These are not distinguishable in the pDCPD laminate, although a slightly more opaque region around the delaminated area in these samples seems to suggest the presence of either micro-cracks or fibre/matrix debonding.

Figure 6:
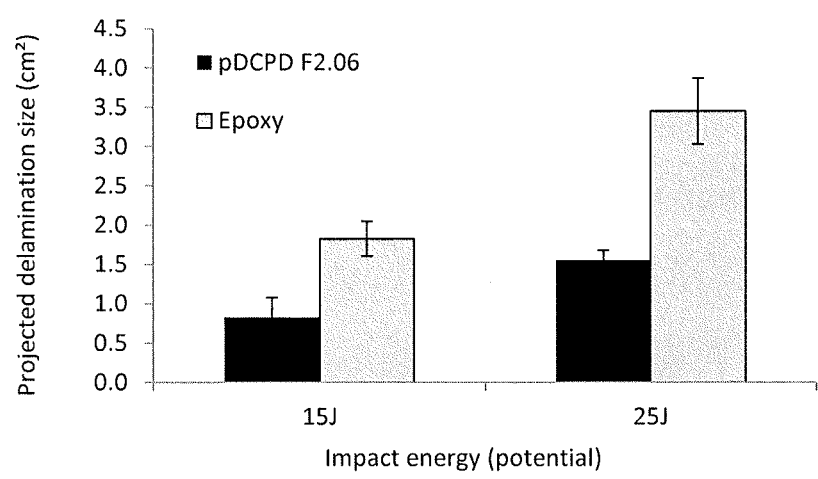
FIG. 6 is a graph showing the projected delamination size for both materials and impact energies, as measured by ultrasonic c-scan.

C-scan ultrasonic imaging was used to determine the size of the delaminations in the impacted samples. Since this is a transmission type of scan, the result of the scan is not the sum of all delamination surfaces present in the material, but rather the projected surface of all superposed delaminations. The results of the scans for both impact energy levels of the two materials are shown in FIG. 6.

All the obtained data from the impact tests indicate a significant difference in delamination size between the pDCPD and the epoxy laminates for equal impact energy. For both impact energy levels tested, the measured delamination size is found to be about two times larger for the epoxy laminate than for the pDCPD laminate, indicating a tougher behavior of the pDCPD composite.

Measurement of Mechanical Properties for Examples from Tables 2 and 3

The interlaminal shear strength (ILSS), flexural strength, and/or flexural modulus of the sized fiber glass strands were measured. The interlaminal shear strength was measured using the ISO 14130 test method. The flexural strength was measured using the. The flexural modulus was measured using the ISO 3597 test method. Table 7 provides the results.

TABLE 7

| Composition | Number of Measurements | Mean ILSS (MPa) | Mean Flexural Strength (MPa) | Mean Flexural Modulus (GPa) |
|---|---|---|---|---|
| 3 | 2 | 17.7 | 561 | 28.8 |
| 4 | 2 | 17.7 | 565 | 27.3 |
| 5* | 2 | 46.7 | 699 | 34.7 |
| 5* | 2 | 44.3 | 861 | 34.5 |
| 6 | 2 | 21.8 | 660 | 30.0 |
| 8** | 2 | 39.9 | 822 | 32.0 |
| 8** | 2 | 39.9 | 924 | 32.2 |
| 7 | 2 | 35.6 | 751 | 31.8 |
| 9 | 2 | 44.4 | 861 | 31.6 |
| 13 | 4 | 22.7 | — | — |
| 11 | 4 | 28.6 | — | — |
| 12 | 4 | 34.8 | — | — |
| 15 | 6 | 37.1 | — | — |
| 10 | 4 | 43.5 | — | — |
| 14 | 6 | 43.2 | — | — |

*Compositions contain the same components but the formulations were separately prepared.
**Compositions contain the same components but the formulations were separately prepared.

Desirable characteristics, which can be exhibited by the present invention, include, but are not limited to the provision of: sizing compositions which are suitable for fiber glass that may be used to reinforce cycloolefinic resins cured by ROMP catalysts; sizing compositions which are suitable for fiber glass to reinforce DCPD resins cured by ROMP catalysts; sizing compositions that can potentially participate in the polymerization and cross-linking mechanism of the DCPD resin; sizing compositions that utilize ingredients having a low potential to deactivate the ROMP catalyst; fiber glass that is effective reinforcement for cycloolefinic resins that cure by the ROMP reaction; fiber glass that is effective reinforcement for DCPD resins that cure by the ROMP reaction; DCPD composites having desirable shear strengths; DCPD composites having SBS values that substantially approach the SBS value of un-reinforced cured DCPD resin; and a cost-competitive, low viscosity resin system (e.g., a resin system developed from DCPD monomer) that cures without styrene co-monomer/diluent.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

That which is claimed:

1. A sizing composition for glass fibers, comprising:
a film-former comprising a polymer, wherein each repeating unit of the polymer comprises at least four carbon atoms and at least one carbon-carbon double bond, the double bond being in the backbone chain of the polymer; and
a silane,
wherein the polymer comprises polybutadiene and wherein the sizing composition comprises at least about 60 weight percent polybutadiene and more than 5 weight percent silane on a total solids basis, and
wherein one or more of the repeating units in the polymer comprises at least one pendant group.

2. The sizing composition of claim 1,
wherein the repeating unit of the polymer comprises up to six carbon atoms.

3. The sizing composition of claim 1, wherein the at least one pendant group comprises at least one vinyl group.

4. The sizing composition of claim 1, wherein the at least one group comprises at least one cyclic pendant group.

5. The sizing composition of claim 1, wherein one or more of the repeating units in the polybutadiene comprises at least one pendant group.

6. The sizing composition of claim 1, wherein the sizing composition comprises at least about 70 weight percent polybutadiene on a total solids basis.

7. The sizing composition of claim 1, wherein the polybutadiene has a number average molecular mass of less than 20,000.

8. The sizing composition of claim 1, wherein the polybutadiene has a number average molecular mass of less than 10,000.

9. The sizing composition of claim 1, wherein the film-former comprises at least about 70 weight percent of the sizing composition on a total solids basis.

10. The sizing composition of claim 1, wherein a first film-former comprises at least about 20 weight percent of the sizing composition on a total solids basis.

11. The sizing composition of claim 10, further comprising a second film-former.

12. The sizing composition of claim 11, wherein the second film-former comprises at least about 20 weight percent on a total solids basis.

13. The sizing composition of claim 1, wherein the silane comprises a terminal vinyl group.

14. The sizing composition of claim 1, wherein the silane comprises a vinylbenzyl group.

15. The sizing composition of claim 1, wherein the silane comprises a vinyltrialkoxysilane.

16. The sizing composition of claim 1, wherein the silane comprises a methacryloxypropyltrialkoxysilane.

17. The sizing composition of claim 1, wherein the silane comprises between about 5 and about 20 weight percent of the sizing composition on a total solids basis.

18. The sizing composition of claim 1, wherein the silane comprises between about 10 and about 20 weight percent of the sizing composition on a total solids basis.

19. A sizing composition for glass fibers, comprising:
a film-former comprising a polymer, wherein each repeating unit of the polymer comprises at least four carbon atoms and at least one carbon-carbon double bond, the double bond being in the backbone chain of the polymer; and
a silane, wherein the polymer comprises polybutadiene and wherein the sizing composition comprises at least about 60 weight percent polybutadiene and more than 5 weight percent silane on a total solids basis, and wherein one or more of the repeating units in the polybutadiene comprises at least one pendant group.

20. A sizing composition for glass fibers, comprising:

a film-former comprising a polymer, wherein each repeating unit of the polymer comprises at least four carbon atoms and at least one carbon-carbon double bond, the double bond being in the backbone chain of the polymer; and a silane, wherein the polymer comprises polybutadiene and wherein the sizing composition comprises at least about 60 weight percent polybutadiene and more than 5 weight percent silane on a total solids basis, and wherein the silane comprises a vinylbenzyl group.

21. A fiber glass strand comprising at least one glass fiber at least partially coated with the sizing composition of claim 1.

22. A polyolefin composite, comprising:

(a) a plurality of glass fibers at least partially coated with the sizing composition of claim 1; and (b) a poly olefin prepared by polymerizing a cycloolefin using a ring-opening metathesis polymerization catalyst.

23. The polyolefin composite of claim 22, wherein the polyolefin comprises polymers formed by polymerizing dicyclopentadiene.

* * * * *